United States Patent [19]

Glance

[11] Patent Number: 4,460,205
[45] Date of Patent: Jul. 17, 1984

[54] ENERGY ABSORBING VEHICLE BUMPER ASSEMBLY

[75] Inventor: Patrick M. Glance, Plymouth, Mich.

[73] Assignee: Concept Anaylsis Corporation, Plymouth, Mich.

[21] Appl. No.: 332,752

[22] Filed: Dec. 21, 1981

[51] Int. Cl.³ .............................................. B60R 19/06
[52] U.S. Cl. ...................................... 293/120; 293/136
[58] Field of Search ............... 293/120, 122, 131, 132, 293/135, 136, 147, 148, 152, 155

[56] References Cited

U.S. PATENT DOCUMENTS

| | | | |
|---|---|---|---|
| 3,843,182 | 10/1974 | Walls et al. | 293/88 |
| 3,866,963 | 2/1975 | Weller | 293/88 |
| 3,880,455 | 4/1975 | Toemmeraas | 293/136 |
| 3,933,387 | 1/1976 | Salloum | 293/120 |
| 3,997,207 | 12/1976 | Norlin | 293/71 |
| 4,029,350 | 6/1977 | Goupy et al. | 293/71 |
| 4,082,338 | 4/1978 | Hutai | 293/136 |
| 4,085,956 | 4/1978 | Weisshappel | 293/136 |
| 4,106,804 | 8/1978 | Scrivo | 293/63 |

*Primary Examiner*—Robert R. Song
*Attorney, Agent, or Firm*—John A. Waters

[57] ABSTRACT

An energy absorbing vehicle bumper assembly is provided which includes at least two rigid mounting members with rigid rectangular plates attached to the distal ends of each of the mounting members. Resilient energy absorbing means are attached to the face of each of the plates. A bumper beam comprising a generally hollow channel member having a generally rectangular cross section with an open, longitudinally extending groove in its rear side is mounted over the plates and energy absorbing means with the distal ends of the mounting members in the beam groove so that the bumper beam will move toward the mounting members when an external load is exerted on the beam and will return to its original position when the load is removed.

11 Claims, 6 Drawing Figures

ENERGY ABSORBING VEHICLE BUMPER ASSEMBLY

BACKGROUND OF THE INVENTION

1. Field of the Invention

The present invention relates to vehicle bumpers, and, more particularly, to an energy absorbing vehicle bumper assembly.

2. Description of the Prior Art

With the recent proliferation of governmental standards on vehicle bumper systems, a wide variety of energy absorbing bumper systems have been proposed. Designs heretofore proposed have ranged from manufacturing the bumpers out of resilient material to mounting rigid bumpers on conventional shock absorbers. To date, however, none has proven to be entirely satisfactory. Even in instances where the energy absorbing characteristics have been somewhat satisfactory, these systems have been generally complex and prohibitively costly. Accordingly, there is a continuing need for an improved energy absorbing vehicle bumper assembly which is simple, light weight, damage resistent and which can be manufactured at a reasonably low cost.

SUMMARY OF THE INVENTION

According to the present invention there is provided a light weight, damage resistent, energy absorbing vehicle bumper assembly which can be manufactured at a reasonably low cost. The bumper assembly comprises at least two rigid mounting members having rigid rectangular plates attached to the distal ends thereof and perpendicular thereto. Resilient energy absorbing means, preferably resilient pads of urethane foam, polyethylene, rubber or ethylene vinyl acetate are attached to the face of each of the plates.

A bumper beam comprising a generally hollow channel member having a generally rectangular cross section with an open, longitudinally extending groove in its rear side is mounted over the plates and energy absorbing means with the distal ends of the mounting members in the bumper beam groove so that the bumper beam will move toward the mounting members when an external load is exerted on the beam and will return to its original position when the load is removed. Preferably, the bumper beam is made of compliant plastic material such as polycarbonate, glass-filled polypropylene, glass-filled polyester or other similar composite material.

In the preferred embodiment, means are provided for preventing lateral movement of the bumper beam with respect to the mounting members.

DESCRIPTION OF THE PREFERRED EMBODIMENTS

Figure 1:
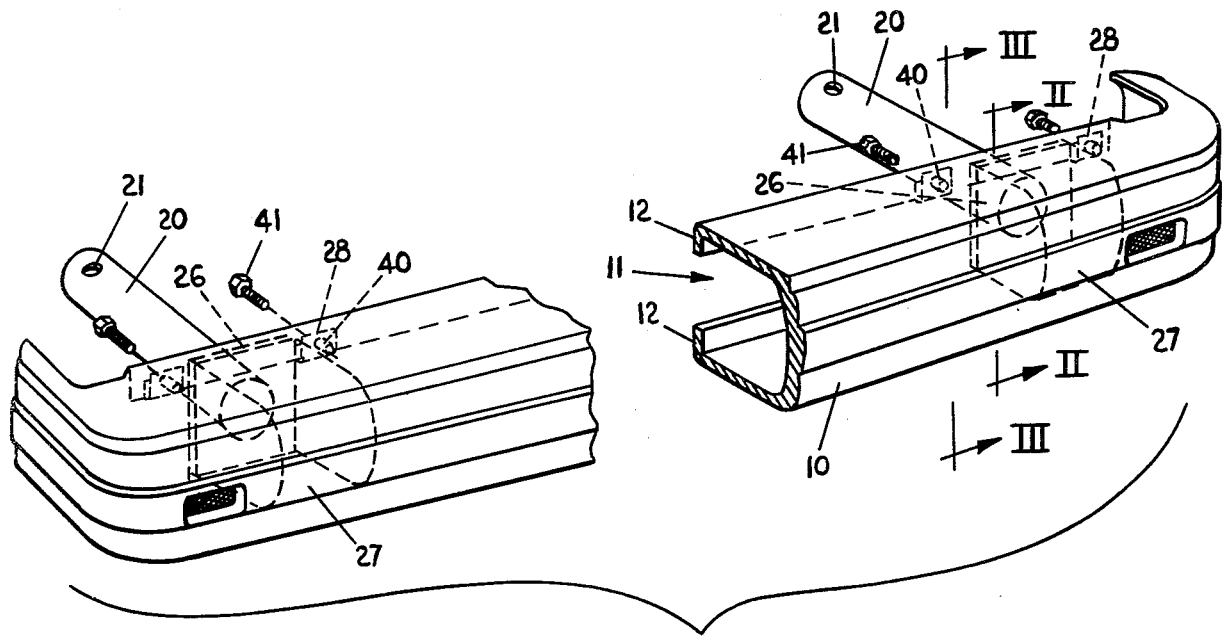
FIG. 1 is a perspective view of the vehicle bumper assembly of the present invention.
Figure 2:
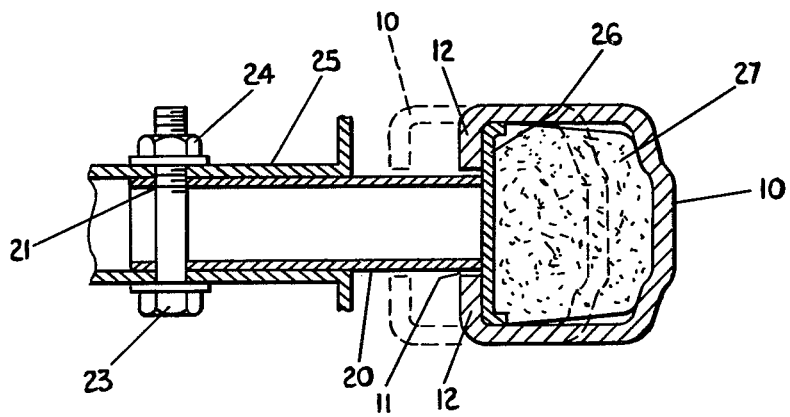
FIG. 2 is a side cross-sectional view of the vehicle bumper assembly taken along the line II—II of FIG. 1.

Referring to the drawings in greater detail, the unique energy absorbing vehicle bumper assembly of the present invention is shown in perspective in FIG. 1. As shown, the bumper assembly includes bumper beam 10 and a pair of rigid mounting brackets 20. Apertures 21 are provided in the proximal ends of brackets 20 for mounting the assembly to the vehicle frame, such as is shown in FIG. 2 where bolt 23 and nut 24 are used to mount bracket 20 to vehicle frame member 25. While tubular steel mounting brackets 20 are shown in FIG. 1, other rigid brackets of various rigid materials and configurations can be employed to accommodate the particular vehicle frame, such as, for example, the variations shown in FIGS. 4 and 5, mounting brackets 210 and 310, respectively.

Rigid rectangular plates 26 are attached to the distal ends of each of mounting members 20, perpendicular thereto. The height of plates 26 should be just slightly less than the inside height of bumper beam 10 as shown in FIG. 2.

Figure 3:
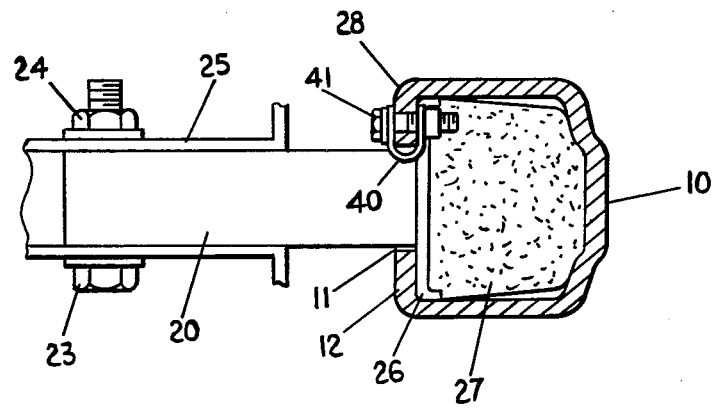
FIG. 3 is a side cross-sectional view of the bumper assembly of FIG. 1 taken along the line III—III of FIG. 1.
Figures 4, 5:
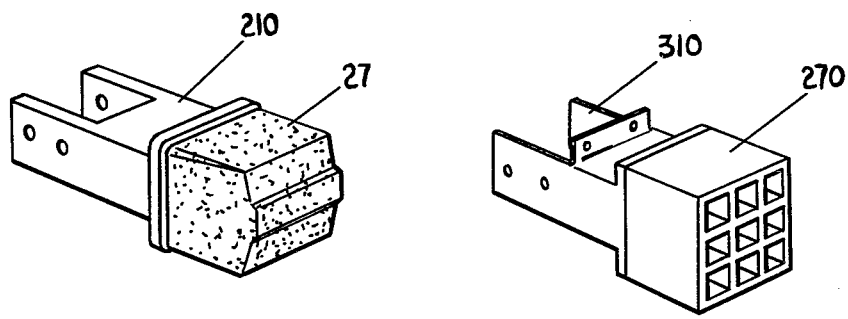
FIG. 4 is a perspective view of a variation of a mounting member with resilient energy absorbing means attached to the face thereof.
FIG. 5 is another variation of a mounting member with resilient energy absorbing means attached to the face thereof.

Resilient energy absorbing means, preferably a resilient pad 27, is attached to the face of each of plates 26. Any conventional secure means of attachment can be employed, such as for example, gluing. As best shown in FIGS. 2 and 3, resilient pad 27 should be sized to completely fill the inside area of bumper beam 10 directly in front of plate 26. While a wide variety of resilient materials can be employed for pad 27, the preferred pads are made from urethane foam, polyethylene, rubber or ethylene vinyl acetate. An alternative pad configuration is shown in FIG. 5. As shown, pad 270 is of an egg crate configuration and is preferably made of ethylene vinyl acetate or polyethylene.

Bumper beam 10 is a generally hollow channel member with a generally rectangular cross section having the external appearance of a conventional bumper. Bumper beam 10 has an open, longitudinally extending groove 11 in its rear side defined by depending, opposing lip portions 12. The height of groove 11 should be just slightly greater than the height of mounting brackets 20. Lip portions 12 stop short of each end of bumper beam 10 to provide an enlarged opening at the rear of the bumper at each end so that the mounting member-resilient pad assemblies can be introduced into the interior of bumper beam 10 to the position shown in FIG. 1 by sliding laterally. In this position, the bumper beam is mounted over plates 26 and resilient pads 27 with the distal ends of mounting members 20 in groove 11.

In order to prevent lateral movement of bumper beam 10 with respect to mounting members 20, stop means are mounted in the upper lip portion 12 adjacent each side of each of plates 26. As best shown in FIGS. 1 and 3, apertures 28 are provided in upper lip portion 12 adjacent each side of plates 26. Conventional clip nuts 40 are clipped over holes 28 and bolts 41 are screwed into clip nuts 41 are that the ends of bolts 41 extend passed plates 26 to thereby prevent lateral movement of bumper beam 10.

Bumper beam 10 can be constructed from a wide variety of materials. Although bumper beam 10 can be rigid and made of conventional metals, such as steel or aluminum, it is preferred that bumper beam 10 be made of a compliant material such as plastic. Especially preferred plastics for use in constructing bumper beam 10 are polycarbonate, Axdel ®, a glass-filled polypropylene manufactured by PPG Industries, HMC, a glass-filled thermoset polyester manufactured by PPG Industries and Owens-Corning Fiberglass Corporation, or other similar composite materials.

By the above design of the vehicle bumper assembly, the mounting brackets and resilient pads hold the bumper in place but permit movement of the bumper beam toward the vehicle when an external load is exerted on the beam, such as shown in phantom in FIG. 2. When the load is removed, bumper beam 10 will return to its original position.

Figure 6:
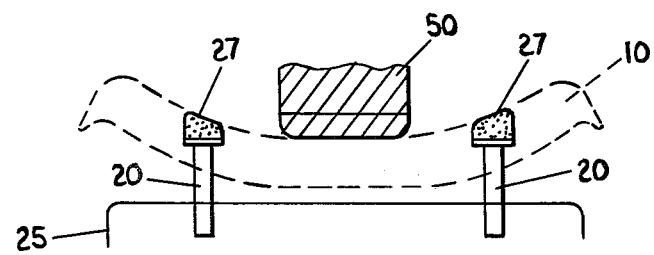
FIG. 6 is a schematic plan view of the bumper assembly with an external force being exerted thereon.

In addition, when bumper beam 10 is constructed of a compliant material, additional energy absorbtion is accomplished, such as shown in schematic in FIG. 6. As shown, when the external obstacle 50 is hit by the vehicle, there is a combination of energy absorbtion between the deflection bending of bumper beam 10 and the compression of pads 27 permitting bumper beam 10 to move toward the vehicle. In addition, if an obstruction is hit below or above the center line of bumper beam 10, there is also a slight rotational deflection permitted which further increases the energy absorbtion. Also, because of the presence of resilient pads 27, bending moments are reduced and, accordingly, stresses at the bumper beam to the mounting bracket locations are also reduced. This permits for a more efficient, light weight bumper.

Thus, the energy absorbing vehicle bumper assembly of the present invention is light weight, energy absorbing and damage resistant. It eliminates the need for more complex structures, such as stroking shock absorbers which have been employed in the past. Because of the simplicity of the design, the unique bumper assembly can be used for front and rear vehicle bumpers, can be manufactured at reasonably low cost and can be structured to meet the current governmental standards. No exposed bolts are required in the bumper face which eliminate stress riser holes, and a light weight beam can be employed. Massive and costly mechanical and hydraulic devices are eliminated. Energy absorbtion and dissipation are accomplished for bumper impact at virtually all locations on the bumper beam, including corner hits and high or low impacts.

While the preferred embodiments of the present invention have been described and illustrated, it will be obvious to those skilled in the art that various changes and modifications can be made without departing from the spirit of the present invention. Accordingly, the scope of the present invention is deemed to be limited only by the appended claims.

The embodiments of the invention in which an exclusive property or privilege is claimed are defined as follows:

1. An energy absorbing vehicle bumper assembly comprising:
   at least two rigid mounting members;
   a rigid plate having upper and lower edges attached to the distal ends of each of said mounting members perpendicular thereto;
   resilient energy absorbing means attached to the face of each of said plates; and
   a bumper beam comprising a rearwardly facing hollow channel member having a front portion and upper and lower portions extending rearwardly therefrom, rear edges of the upper and lower portions including downwardly and upwardly extending lip portions, respectively, that fit behind the plates and serve as a backing therefor such that the plates abut and are restrained against rearward movement by the lips when the bumper assembly is in its non-impact position, the lips terminating at a point spaced at least slightly away from the rigid mounting members so as to permit at least limited impact rotation of the bumper beam about the longitudinal axis of the bumper beam, the resilient energy absorbing means extending from each plate into contact with the front portion of the bumper and substantially filling the interior of the bumper beam at the point adjacent the plates, the upper and lower portions of the bumper beam conforming generally to the shape of the upper and lower edges of the plates and being positioned adjacent to the upper and lower edges of the plates such that they permit the plates to slide substantially freely in a forward direction but are held by the plates in a substantially fixed vertical position, the bumper beam also permitting rotational movement of the bumper beam with respect to the plates about the longitudinal axis of the bumper beam and the vertical axis upon impact, such that the bending moment on the plates and rigid mounting members is reduced.

2. A vehicle bumper assembly according to claim 1 wherein said bumper beam is made of a compliant material.

3. A vehicle bumper assembly according to claim 2 wherein said compliant material is selected from the group consisting of polycarbonate, glass-filled polypropylene and glass-filled polyester.

4. A vehicle bumper assembly according to claim 1 wherein said resilient energy absorbing means is a resilient pad.

5. A vehicle bumper assembly according to claim 4 wherein said resilient energy absorbing means is a resilient pad selected from the group consisting of urethane foam, polyethylene, rubber and ethylene vinyl acetate.

6. A vehicle bumper assembly according to claim 2 wherein said resilient energy absorbing means is a resilient pad.

7. A vehicle bumper assembly according to claim 6 wherein said resilient energy absorbing means is a resilient pad selected from the group consisting of urethane foam, natural rubber and ethylene vinyl acetate.

8. A vehicle bumper assembly according to claim 1 including means for preventing lateral movement of said bumper beam with respect to said mounting members.

9. A vehicle bumper assembly according to claim 6 including means for preventing lateral movement of said bumper beam with respect to said mounting members.

10. A vehicle bumper assembly according to claim 8 wherein the means for preventing lateral movement of the bumper beam with respect to the mounting members comprises projections extending from the lips on the bumper beams at a point adjacent the sides of at least one of the plates, such that sideways movement of the bumper beam is restrained by engagement between the plate and a projection.

11. A vehicle bumper assembly according to claim 10 wherein the projections comprise threaded fasteners extending through openings in the lips.

* * * * *